(12) United States Patent
Amparan et al.

(10) Patent No.: US 6,882,757 B2
(45) Date of Patent: Apr. 19, 2005

(54) VELOCITY MATCHED WAVEGUIDE FOR TRAVELING-WAVE OPTICAL MODULATORS

(75) Inventors: Alfonso B. Amparan, Loveland, CO (US); David Gines, Fort Collins, CO (US); Russell Wayne Gruhlke, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 196 days.

(21) Appl. No.: 10/328,689

(22) Filed: Dec. 23, 2002

(65) Prior Publication Data

US 2004/0120624 A1 Jun. 24, 2004

(51) Int. Cl.[7] .............................. G02F 1/01; G02F 1/035
(52) U.S. Cl. .................................... 385/1; 385/2; 385/3
(58) Field of Search .......................................... 385/1–3

(56) References Cited

U.S. PATENT DOCUMENTS 6,172,791 B1 * 1/2001 Gill et al. .................... 359/249

* cited by examiner

Primary Examiner—John D. Lee
Assistant Examiner—Tina M Lin

(57) ABSTRACT

Method and apparatus for velocity matching an optical signal propagating in a traveling-wave optical modulator with a modulating signal. The optical signal and the modulating signal are propagated at an angle greater than zero degrees with respect to one another to adjust a path length of at least one of the signals relative to the other of the signals.

20 Claims, 4 Drawing Sheets

VELOCITY MATCHED WAVEGUIDE FOR TRAVELING-WAVE OPTICAL MODULATORS

BACKGROUND OF THE INVENTION

1. Technical Field of the Invention

The present invention relates generally to the field of optical modulation; and, more particularly, to a method and apparatus for velocity matching an optical signal propagating in a traveling-wave optical modulator with a modulating signal.

2. Description of Related Art

In optical communications systems, electro-optic and electro-absorptive optical modulators are often used to modulate an optical signal. One class of electrode used with electro-optic and electro-absorptive optical modulators is the "traveling-wave" type, wherein an RF electrode, such as a microwave electrode, for example, is positioned on top of or in parallel with an optical waveguiding modulator. The microwave signal represents data to be transmitted, and modulates an optical signal propagating in the waveguide by changing a property or properties of the optical signal. For example, the modulator may be configured to change the intensity of the light signal propagating in the waveguide in some relationship to the applied microwave signal.

To optimize coupling between the electrical field of the electrode and the optical field propagating in the waveguide, the microwave signal should propagate along the modulator with the same velocity as the optical signal. Microwave signals and optical signals, however, may travel through the modulator at different velocities, resulting in a reduction in efficiency and bandwidth. Typical InP-based optical modulators that are described in the literature, for example, report an optical velocity that is about twice the microwave velocity. The negative effects of such a velocity mismatch become increasingly significant as the length of the waveguide increases, as is the current trend in the industry.

There is, accordingly, a need for a method and apparatus for velocity matching an optical signal propagating in a traveling-wave optical modulator with a modulating signal.

SUMMARY OF THE INVENTION

Embodiments in accordance with the invention provide a method and apparatus for velocity matching an optical signal propagating in a traveling-wave optical modulator with a modulating signal.

A method for velocity matching an optical signal propagating in a traveling-wave optical modulator with a modulating signal according to the present invention comprises propagating the optical signal and the modulating signal at an angle greater than zero degrees with respect to one another.

It has been discovered that an exact velocity matching of an optical signal with a modulating signal in a traveling-wave optical modulator is potentially achievable by causing the signals to propagate at an angle greater than zero degrees with respect to one another. By proper selection of the angle, the path length of at least one of the signals can be adjusted to effectively match the velocity of the two signals so as to optimize operating efficiency of the modulator.

Furthermore, the invention provides embodiments with other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Figure 1:
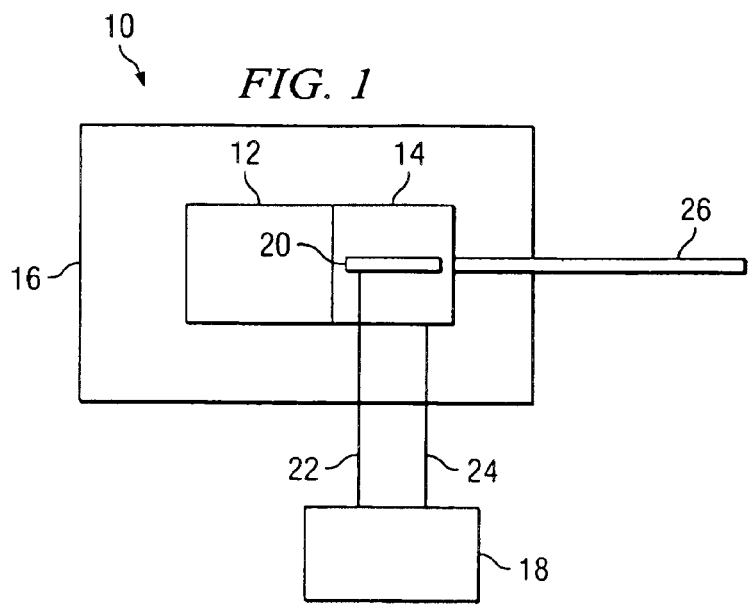
FIG. 1 is a block diagram that schematically illustrates a top view of components of an optical communications system to assist in explaining the present invention.

FIG. 1 is a block diagram that illustrates components of an optical communications system to assist in explaining the present invention. The optical communications system is generally designated by reference number 10, and includes light source 12, for example, a laser source, connected to optical modulator 14, such as an electro-absorptive optical modulator. The light source and the modulator are mounted to substrate 16 and are connected in such a manner that light generated by light source 12 is effectively coupled into optical modulator 14.

Data source 18 is connected to input terminal 20 of optical modulator 14 via signal wire 22 to modulate the intensity of the light that is coupled into the modulator from the light source. A circuit return between the data source and the modulator is made via return wire 24 coupled between the data source and the modulator. A modulated light signal is output from modulator 14 via optical transmission fiber 26, or the like coupled to an output of the modulator.

Figure 2:
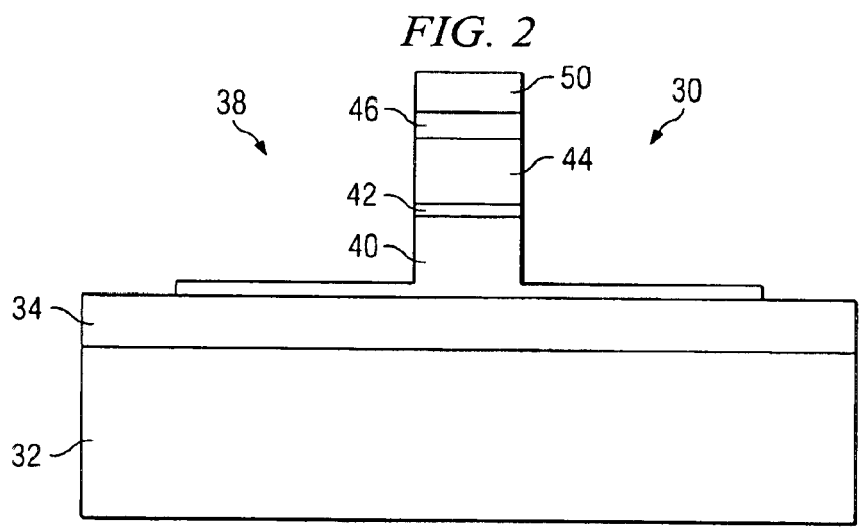
FIG. 2 is a schematic, cross-sectional end view of an electro-absorptive optical modulator that is known in the art to assist in explaining the present invention.

FIG. 2 is a schematic, cross-sectional end view of an electro-absorptive optical modulator that is known in the art to assist in explaining the present invention. The modulator is generally designated by reference number 30, and may correspond to modulator 14 in FIG. 1. Modulator 30 is composed of a plurality of layers. In particular, modulator 30 includes non-conductive InP substrate 32 having a thickness of 100 μm, $E_r=12.65$. Lower cladding layer 34 is provided on substrate 32. Lower cladding layer 34 comprises an N+ doped layer having a thickness of 1μm.

Ridged portion 38 is positioned on lower cladding layer 34 and extends upwardly from lower cladding layer 34. Ridged portion 38 has a width of 3 μm, and includes N− doped layer 40 having a thickness of 2 μm. As shown in FIG. 2, layer 40 includes a thin portion that extends outwardly from each side of the ridged portion for a distance of 20 μm. Intrinsic layer 42 (MQW) is applied on layer 40 and has a thickness of 0.2 μm.

Layers 44 and 46 are provided above intrinsic layer 42. Layer 44 comprises a P− doped layer having a thickness of 2 μm. Layer 46 comprises a P+ doped layer, and gold conductor layer 50 is applied above layer 46.

In the optical modulator of FIG. 2, intrinsic(core) layer 42 comprise an optical waveguide that extends in a direction perpendicular to the plane of the FIGURE. Layers 40 and 44 comprise upper and lower cladding layers to provide vertical confinement, and air or low-dielectric constant material on the sides provide lateral confinement.

Figure 3A:
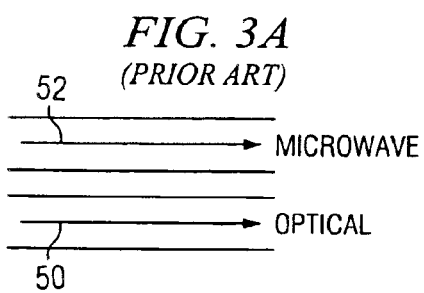
FIG. 3A is a diagram that schematically illustrates an optical signal and a microwave signal propagating in parallel in an optical modulator to assist in explaining the present invention.

As illustrated in FIG. 3A, during operation of a known electro-absorptive optical modulator of the traveling-wave type, light signal 50 and microwave signal 52 propagate in the modulator in parallel (i.e., at an angle of zero degrees with respect to one another) for a prescribed distance. For optimal results, the microwave signal and the light signal should propagate in the modulator at the same velocity. As indicated previously, however, the signals may travel at different velocities, and prior efforts to match the velocities of the two signals have not been fully satisfactory.

For example, one known approach to matching the velocity of the optical and microwave signals in a modulator is to adjust the cross-sectional geometry of the optical waveguide to modify parameters of the microwave transmission line in order to change the phase velocity of the microwave signal. Changing the cross-sectional geometry of the optical waveguide, however, may make the waveguide unacceptably narrow; and may also change the characteristic impedance of the microwave transmission line and increase losses.

It is also known to use various dielectric materials in the modulator to change the effective index of refraction of the microwave signals. For example, using air instead of a dielectric material (air-loading) will increase the microwave phase velocity. It is often not possible to use air or low dielectric constant materials in the modulator, however, since other materials may be necessary to provide structural support or for fabrication reasons.

Figure 3B:
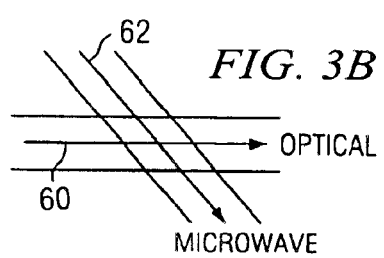
FIG. 3B is a diagram that schematically illustrates an optical signal and a microwave signal propagating at an angle greater than zero degrees with respect to one another in an optical modulator according to an exemplary embodiment of the present invention.

In accordance with the present invention, the effective path length of the optical signal and/or the microwave signal is adjusted in order to achieve a velocity match between the signals. In an exemplary embodiment of the invention, a velocity match is accomplished by causing the optical signal and the microwave signal to propagate at an angle greater than 0 degrees with respect to one another. This angular relationship is schematically illustrated in FIG. 3B wherein optical signal 60 propagates in a first direction and microwave signal 62 propagates in a second direction that is at an angle greater than 0 degrees with respect to the first direction (i.e., the signals propagate in directions that are not parallel to one another). As will be explained, by properly adjusting the angle between the first and second directions, the velocity of the optical signal and the microwave signal can, potentially, be exactly matched with one another to optimize operation of the modulator.

Figure 4:
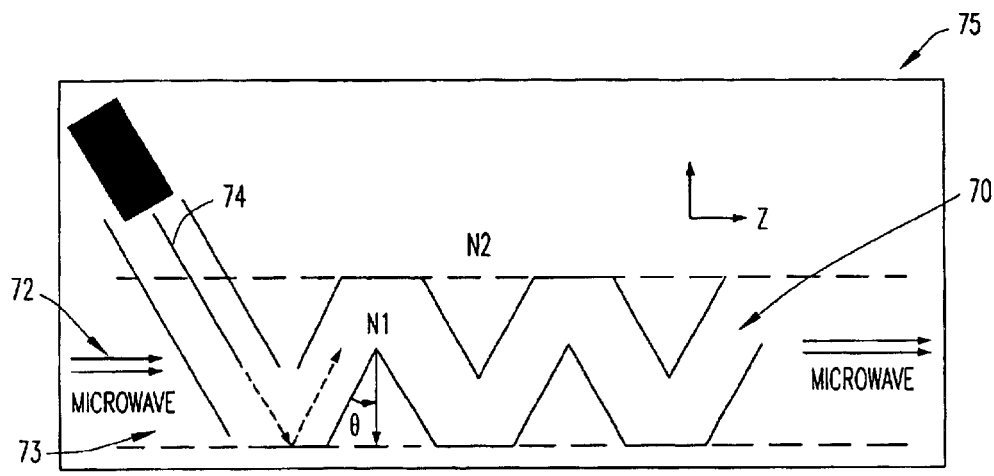
FIG. 4 is a schematic, top view of an optical waveguide of an optical modulator according to another exemplary embodiment of the present invention.

FIG. 4 is a schematic, top view of an optical modulator 75, that may correspond to, and comprise a top view of modulator 30 in FIG. 2, according to an exemplary embodiment of the present invention. Modulator 75 includes optical waveguide 70 formed to have a zigzag shape, and microwave waveguide 73 having a straight shape. Thus, as shown in FIG. 4, microwave signal 72 travels through microwave waveguide 73 in substantially a straight line, whereas optical signal 74 travels through optical waveguide 70 in a zigzag path defined by optical waveguide 70 (with reference to FIG. 2, the microwave signal will travel through gold conductive region 50, and the optical signal will travel through layer 42). By properly designing the geometry of optical waveguide 70, and by controlling the indices of refraction N1 and N2 of the waveguide and the body of the modulator, respectively, it becomes possible to control the path length of the optical signal so that the optical signal and the microwave signal will travel through the modulator at substantially the same velocity.

Figure 5A:
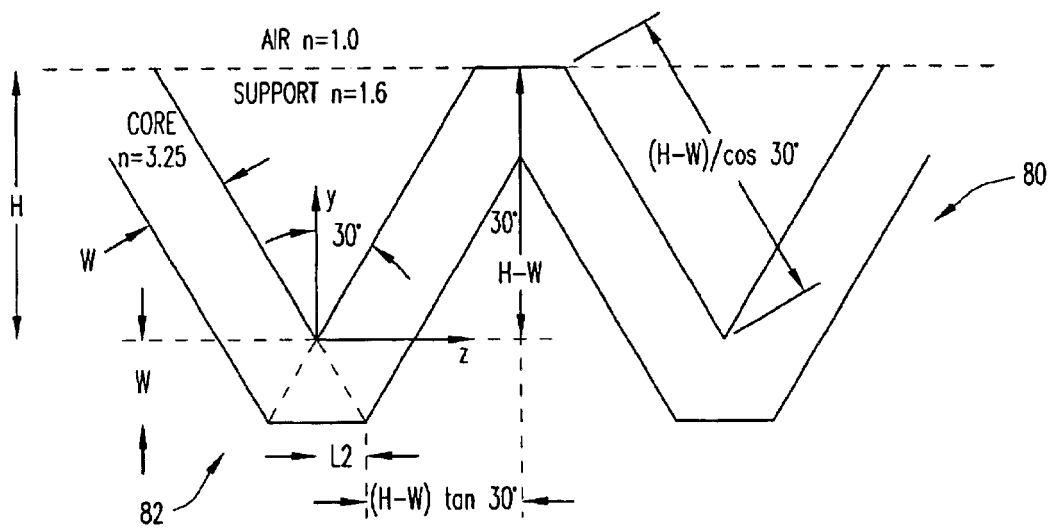
FIG. 5A is a schematic top view of the optical waveguide of FIG. 4 illustrating a specific geometry for reducing the velocity of an optical signal propagating in the waveguide by a factor of two according to another exemplary embodiment of the present invention.
Figure 5B:
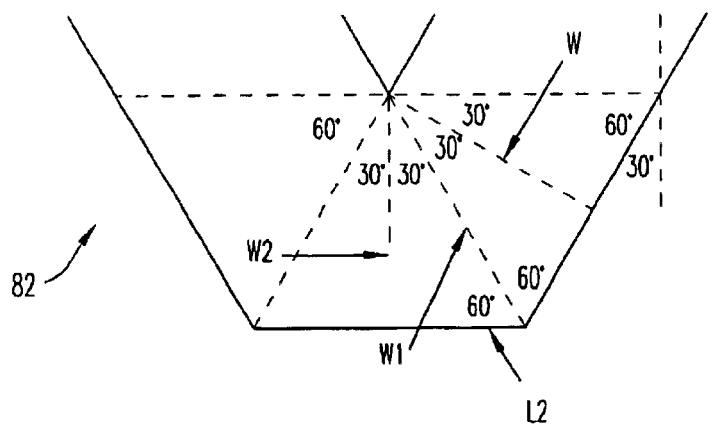
FIG. 5B is an enlarged view of a portion of the optical waveguide of FIG. 5A to illustrate details of the specific geometry of the optical waveguide of FIG. 4.

As indicated previously, in a typical InP-based optical modulator, the optical velocity is about twice that of the microwave velocity. FIGS. 5A and 5B illustrate details of a specific geometry of zigzag optical waveguide 80 for reducing the velocity of the optical signal by a factor of two to match the velocities of the optical and microwave signals in an InP-based modulator. In effect, the optical waveguide is designed to double the path length of the optical signal relative to the microwave signal. In the exemplary embodiment illustrated in FIGS. 5A and 5B, the core of the optical waveguide has an index of refraction of 3.25, the support has an index of refraction of 1.6 and the core is in air having an index of refraction of 1.0. Note that FIG. 5B is an enlarged view of portion 82 of waveguide 80 to more clearly illustrate the geometry of that portion of the waveguide. In the embodiment of FIGS. 5A and 5B, the critical angle for total internal reflection is about 28 degrees, and a half angle of 30 degrees creates an equilateral triangle that doubles the path length of the optical signal.

Figure 6A:
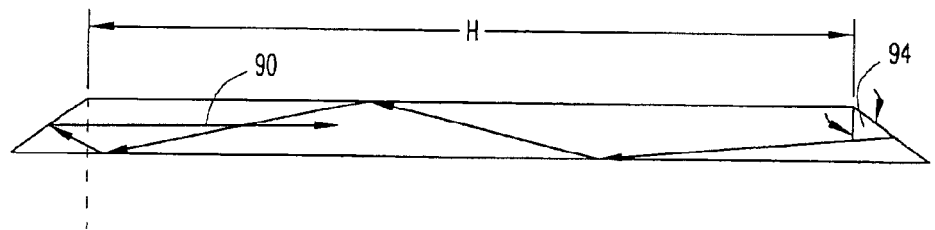
FIGS. 6A and 6B are diagrams that schematically illustrate a manner in which losses due to side-wall tilt of an optical waveguide may be compensated for according to another exemplary embodiment of the present invention.
Figure 6B:
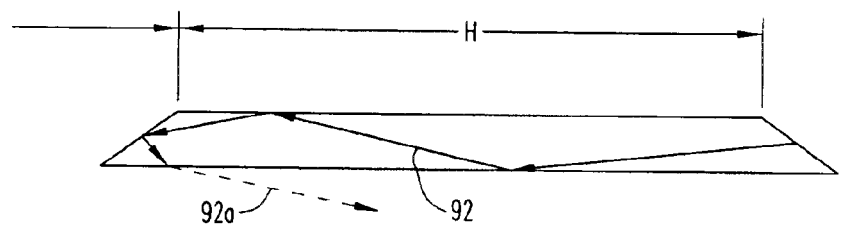

When constructing an optical waveguide, such as waveguide 80 in FIG. 5A, fabrication limitations make it difficult to construct a waveguide in which the side-walls are perfectly vertical. As a result, there is typically a certain amount of side-wall tilt, illustrated at 94 in FIG. 6A, which can result in losses. FIGS. 6A and 6B are diagrams that schematically illustrate a manner in which losses due to side-wall tilt may be compensated for according to an exemplary embodiment of the present invention.

As shown in FIGS. 6A and 6B, the effects of side-wall tilt may be compensated for by appropriately choosing the path length H of each segment of the waveguide. In FIG. 6A, the path length H is such that optical signal 90 remains in the waveguide, whereas in FIG. 6B, the path length is such that a portion of optical signal 92 escapes from the waveguide as shown at 92a resulting in some loss.

Figure 7:
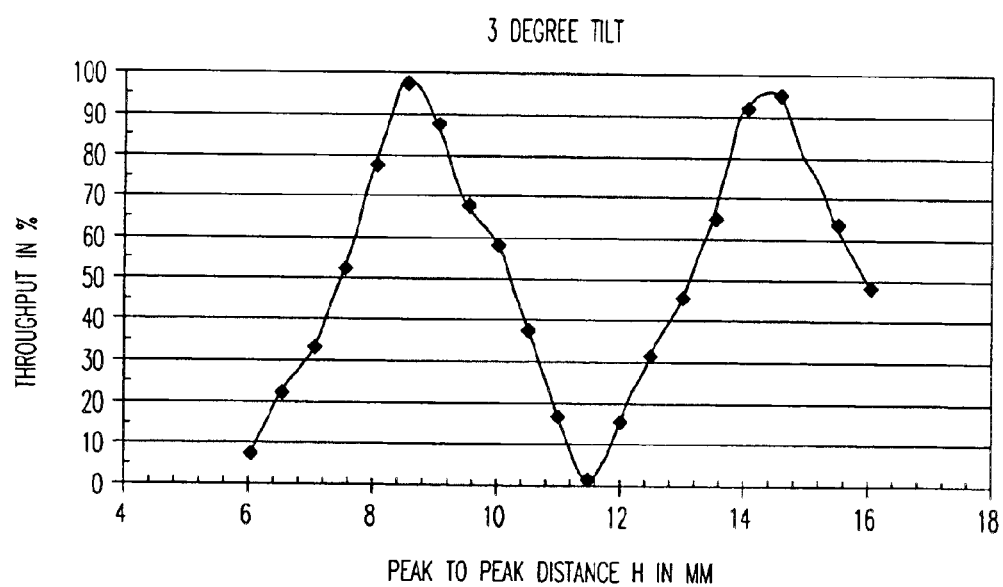
FIG. 7 is a ray-tracing simulation of throughput versus length for an optical waveguide having a side-wall tilt of 3 degrees.

FIG. 7 is a typical ray-tracing simulation of throughput versus length H for an optical waveguide having a side-wall tilt of 3 degrees.

Figure 8:
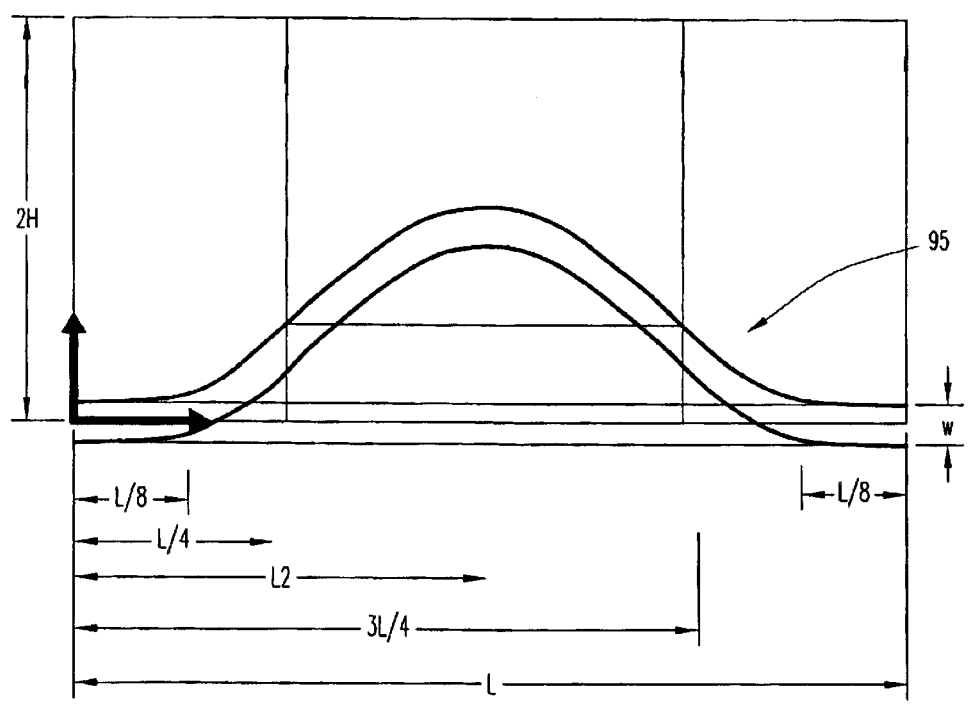
FIG. 8 is a schematic, top view of an optical waveguide of an optical modulator according to another exemplary embodiment of the present invention.

FIG. 8 is a schematic, top view of an optical waveguide of an optical modulator according to another exemplary embodiment of the present invention. In the optical waveguide of FIG. 8, one bend of "sinusoidal" optical waveguide 95 is illustrated. In this embodiment, the path length is increased using a curved waveguide, rather than by using a zigzag waveguide with total internal reflection as in the embodiments of FIGS. 4 and 5. Waveguide 95 may exhibit decreased scattering and side-wall losses relative to the zigzag embodiments of FIGS. 4 and 5.

While what has been described constitutes exemplary embodiments of the present invention, it should be recognized that the invention can be varied in many ways without departing from the scope thereof For example, various techniques may be used to optimize the optical waveguide designs. These techniques may include using graded index fibers (or dielectric lensing) to help maintain the light beam within the optical waveguide, and using offset waveguides to minimize optical bending losses. Because the invention can be varied in many ways, it should be understood that the invention should be limited only insofar as is required by the scope of the following claims.

We claim:

1. A method for velocity matching an optical signal propagating in a traveling-wave optical modulator with a modulating signal, comprising causing the optical signal and the modulating signal to propagate at an angle greater than zero degrees with respect to one another.

2. A method for velocity matching an optical signal propagating in a traveling-wave optical modulator with a modulating signal, comprising propagating the optical signal and the modulating signal at an angle greater than zero degrees with respect to one another, and further including selecting said angle to adjust a path length of said optical signal relative to said modulating signal to substantially match the velocity of said optical signal with said modulating signal.

3. The method according to claim 2, and further including the step of adjusting a length of a segment of a segment of an optical waveguide in which said optical signal propagates to reduce side-wall losses.

4. The method according to claim 2, wherein said selecting increases the path length of said optical signal relative to the path length of said modulating signal.

5. The method according to claim 4, wherein said selecting increases the path length of said optical signal to about twice the path length of said modulating signal.

6. The method according to claim 5, wherein said optical modulator comprises an InP-based optical modulator, and wherein said modulating signal comprises a microwave signal.

7. A method for velocity matching an optical signal propagating in a traveling-wave optical modulator with a modulating signal, comprising propagating the optical signal and the modulating signal at an angle greater than zero degrees with respect to one another, wherein said optical modulator includes an optical waveguide having a zigzag configuration, and wherein said step of causing the optical signal and the modulating signal to propagate at an angle greater than zero degrees with respect to one another comprises propagating said optical signal in said zigzag configured waveguide.

8. The method according to claim 7, wherein said optical signal propagates at an angle of about 60 degrees relative to said modulating signal.

9. The method according to claim 1, wherein said optical modulator includes an optical waveguide having a curved configuration, and wherein said step of causing the optical signal and the modulating signal to propagate at an angle greater than zero degrees with respect to one another comprises propagating said optical signal in said curved waveguide.

10. The method according to claim 9, wherein said curved waveguide comprises a sinusoidal waveguide.

11. An apparatus for velocity matching an optical signal propagating in a traveling-wave optical modulator with a modulating signal, comprising an optical waveguide in said optical modulator in which said optical signal propagates, said optical waveguide configured to propagate said optical signal at an angle greater than zero degrees with respect to said modulating signal to provide said optical signal and said modulating signal with different path lengths.

12. The apparatus according to claim 11, wherein said optical waveguide is configured to provide the optical signal with a greater path length than the path length of said modulating signal.

13. The apparatus according to claim 12, wherein said optical waveguide is configured to provide said optical signal with a path length about twice the path length of said modulating signal.

14. The apparatus according to claim 13, wherein said optical modulator comprises an InP-based optical modulator, and wherein said modulating signal comprises a microwave signal.

15. The apparatus according to claim 12, wherein said optical waveguide is configured to have a zigzag shape.

16. The apparatus according to claim 15, wherein the optical signal propagates at an angle of about 60 degrees relative to said modulating signal.

17. The apparatus according to claim 12, wherein said optical waveguide is configured to have a curved shape.

18. The apparatus according to claim 17, wherein said curved shape comprises a sinusoidal shape.

19. The apparatus according to claim 11, wherein said optical modulator comprises an electro-optic optical modulator.

20. The apparatus according to claim 11, wherein said optical modulator comprises an electro-absorptive optical modulator.

* * * * *